B. HOLT.
FLEXIBLE ENDLESS TRACK FOR TRACTION ENGINES.
APPLICATION FILED DEC. 13, 1910. RENEWED JUNE 24, 1913.

1,082,330.

Patented Dec. 23, 1913.

2 SHEETS—SHEET 1.

Witnesses.
Thos. Castley
F. E. Maynard

Inventor.
Benjamin Holt
by G. H. Strong
his atty.

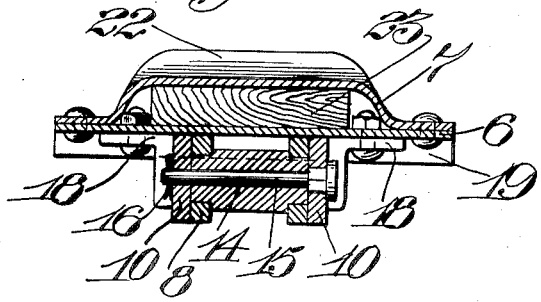
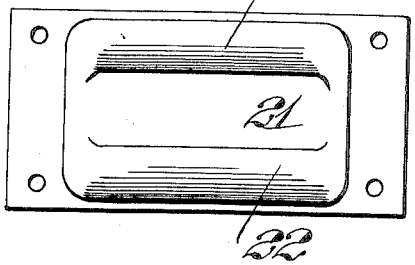
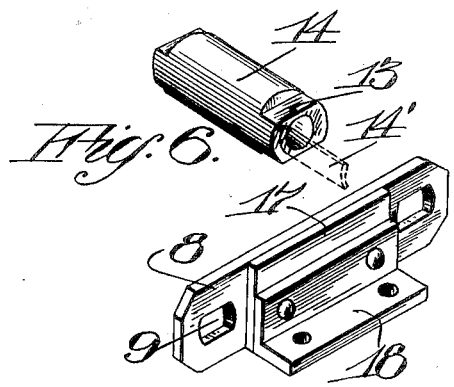
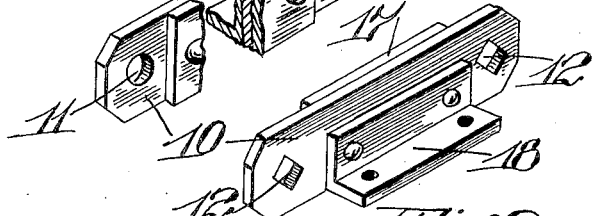

UNITED STATES PATENT OFFICE.

BENJAMIN HOLT, OF STOCKTON, CALIFORNIA.

FLEXIBLE ENDLESS TRACK FOR TRACTION-ENGINES.

1,082,330.   Specification of Letters Patent.   Patented Dec. 23, 1913.

Application filed December 13, 1910, Serial No. 597,083. Renewed June 24, 1913. Serial No. 775,578.

*To all whom it may concern:*

Be it known that I, BENJAMIN HOLT, citizen of the United States, residing at Stockton, in the county of San Joaquin and State of California, have invented new and useful Improvements in Flexible Endless Tracks for Traction-Engines, of which the following is a specification.

This invention relates to traction engines and other vehicles employing endless, flexible traction members or self-laying tracks, and particularly pertains to the tread members and links of such tracks.

The object of my invention is to provide a simple, practical, flexible, endless traction member for supporting and driving traction engines and the like, and involves details of special design and construction, having particularly in view the production of a track or link belt of great strength and durability, economy of manufacture, increase of tractive efficiency, and reduction in weight.

The invention consists of the parts and the construction and combination of parts as hereinafter more fully described and claimed, having reference to the accompanying drawings, in which—

Figure 1:
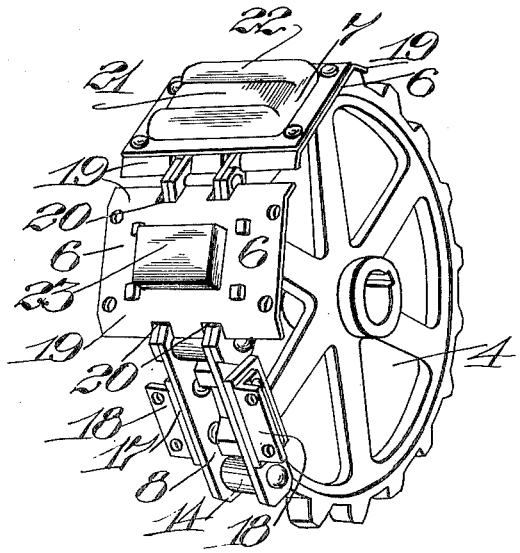
Figure 2:
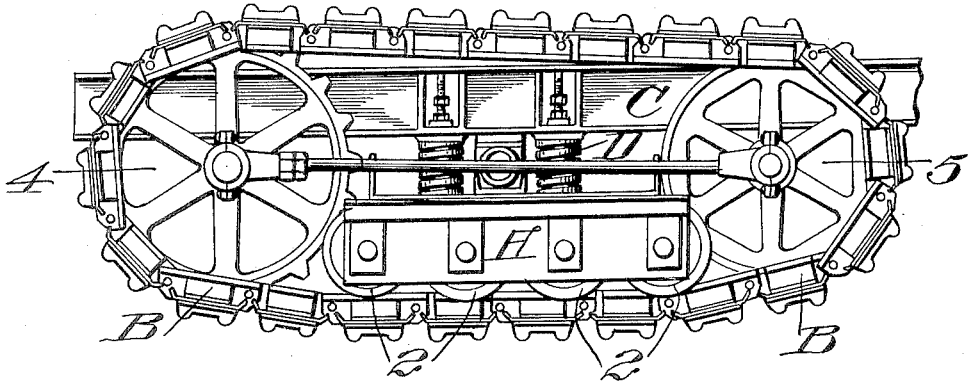

Figure 1 is a perspective view of the track structure. Fig. 2 is a side elevation of a complete track as in position on its drivers and rollers. Fig. 3 is a cross section of the chain and shoe. Fig. 4 is a face view of a shoe. Fig. 5 is a transverse central section of a shoe. Fig. 6 is a perspective view of a separator sleeve block. Fig. 7 is a perspective view of a male link. Figs. 8 and 9 are perspective views of female links.

In traction engines of the so-called "caterpillar" or "self-laying" endless, flexible track or platform wheel type, it is important that the flexible track be strong, reliable, easily assembled and repaired, and made as light as possible; and it is also desirable to design the track members or links so they will present a most effective traction area, and at the same time collect as little soil as possible.

The weight of the traction engine, harvester or other vehicle which the endless track or platform wheel is designed to support and drive, is carried principally on one or more trucks A, Fig. 2, each truck having four wheels 2 resting on the ground run of the endless track or platform B. The engine frame, here represented at C, is mounted on the springs D which permit the truck and endless track or platform to accommodate themselves to the ordinary unevennesses of the field or road and take up shocks due to the same. This track is made of steel links and is, in fact, an endless chain which passes over two sprockets 4—5, front and rear; the rear one being the driver, and the front one a blank sprocket (without teeth) acting merely as an idler. The truck wheels 2 run on the inside of the track chain, while on the outside of each link is a broad plate 6, Figs. 1 and 3, shod with a pressed steel corrugated shoe 7, Figs. 1, 3, 4 and 5. These plates 6 and shoes 7 support the track chain as wooden ties support a railroad track and form the tractive surface, which enables the engine to work on soft ground and gives it its great power at the drawbar.

The construction of the links of this endless chain or flexible track constitutes the important feature of this invention. Alternate links are each made up of two parallel, vertical plates 8, Figs. 3 and 7, having elongated eyes 9 at their ends; and the intermediate links have parallel, vertical plates 10, Fig. 3, overlapping and fitting outside the perforated ends of the plates 8; the plates 8—10 being secured, as later described, to the respective broad back plates 6. The outer female link plates 10, represented in detail in Figs. 8 and 9, are perforated at their ends, the perforations in one link being round, as shown at 11, and in the other link square, as shown at 12. The elongated perforations 9 in the link bars 8 are adapted to receive the flattened or polygonal ends 13 of suitable spacing sleeves 14; the contour of the shouldered ends 13 corresponding to that of the holes 9, the object being to prevent the sleeves 14 from turning, and the separated sleeves 14 of the successive links forming the interdental spaces for the reception of the teeth on the sprocket-wheel 4 whereby the chain is driven.

In assembling the links, the male links carrying the spacing sleeves 14 are placed between the perforated projecting ends of the plates 10 of the female links, with the hole in a sleeve 14 registering with the holes 11—12. Then a pin 15 is passed through the outer plates 10 and sleeve 14; the pin having a head and a square portion to fit the polygonal hole 12, the rounded end of the pin passing through the round perforation 11, the pin being held against loss or accidental withdrawal by suitable means, as the cotter-pin 16.

The pins 15 are case hardened, and the sleeves 14 in which they turn are malleable iron lined with a hardened steel liner 14'; this liner 14' being segmental, fitting a corresponding groove on the interior of the sleeve and arranged on the wearing side. Thus the wear due to the pivotal movement of the links on each other as they travel over the ground and pass around the sprockets is taken directly on these liners or shim-plates 14', Fig. 6, and in the event of wear they can be easily removed and replaced.

In order to strengthen the links of the track and to increase their bearing area on the rollers and sprockets, I prefer to secure the outside reinforcing plates 17 to each link plate 10—8, Figs. 7, 8 and 9, and in addition to and against these outside plates 17 are secured the angle-bars 18, by which latter the broad back plates 6 are pulled to their respective link plates 8—10, Fig. 3. These back plates have their ends bent inwardly or toward the sprockets around which they travel, as shown at 19, and these inwardly bent ends are slotted, at 20, to accommodate the adjacent pivoted ends of the link bars 8 and 10, as shown in Fig. 1. These slots 20 in the back plates 6 allow the latter to accommodate themselves to the sprockets as the chain travels around them, and at the same time the horizontal portion of the chain or link belt, or that part under the trucks and in contact with the ground, will have a practically continuous bearing surface, the edges of the plates coming close together.

The bearing shoes 7 consist of peculiarly shaped plates made more or less pan-shaped, with a central bowl-like projection 21, which latter is transversely corrugated, at 22. These shoes are made of pressed steel and corrugated, but are not sharp, so that they give the wheels a good bite on soft ground, but will not injure any road or pavement. The corrugations 22 bite into the ground sufficiently to keep the chain from slipping on the ground when the sprocket turns, just as the ties of the cogged track keep the track from moving when the gear of the locomotive revolves. The main distinction between an engine of the present link belt type and a cogged track with its geared locomotive is that in the present invention the engine is continually picking up its track chain behind and laying it down again in front. It lays its own track, and carries its track with it wherever it goes. The shoes 7 have a width crosswise of the belt substantially equal to the corresponding width of the back plates 6, but they are not quite so long; the longitudinal edges of the shoes 7 terminating at about the inner ends of the slots 20 and proximate to the angle of the bent-up ends 19 of the plates 6. Since many of these engines, as I build them, weigh eight tons or more, and have been known to haul a total load of over fifty tons, it is necessary that the links of these traction members B be made as powerful as possible, and at the same time not make them unnecessarily heavy. Therefore, in order to strengthen the hollow shoes 7 and prevent their crushing, I fill the space formed between each shoe plate 7 and its supporting plate 6 with a suitable filler, such as the wooden block 23. It is found by experience that these wooden blocks offer a substantial and at the same time slightly yielding reinforce and inside support for these corrugated shoes 7.

In Fig. 1, there is shown a perspective view of three links, the topmost link being complete, the second link having the shoe plate 7 broken away to disclose the wooden filler block 23 and back plate 6, and the third and lowermost link having both the shoe and back plate removed. By the construction of link here shown, the actual ground contacting area for each link is ordinarily on the corrugations 22 and intermediate raised portion 21. On softer ground it may also include the entire surface of the shoe around the raised portion 21, thereby materially increasing the supporting area. By this particular link belt construction, an engine without load has actually climbed a $62\frac{1}{2}\%$ grade of soft, loose earth, stopping on the grade and starting again. In practical work it has pulled loads up grades as high as 30%.

Various practical advantages accrue from the link construction here described: The plates 8—17 and 10—17 which run under the truck rollers 2, combined with the corrugated bulged feature of the shoes 7, elevate the trucks A considerably above the ground, so that the bearings of the latter are kept comparatively clean. The corrugations 22 and the back portions of the raised parts 21, and also the inturned edges 19 of plates 6, all act, particularly in soft or sandy ground, to give maximum tractive efficiency. Also the arrangement of the plates 8 and 10 and the use of the sleeve or separator blocks 14 prevent mud and sand from getting into the joints of the links. The working life of a track of this character is really much longer than that of the best steel railroad track, and the cost of a new track is no greater than that of a new set of tires for an automobile.

Having thus described my invention, what I claim and desire to secure by Letters Patent is—

1. A link consisting of a back plate with upturned ends, a corrugated shoe secured thereto on one side, with pivotally connecting means on the opposite side for connection with another link, and a filler of light material between the shoe and back plate.

2. A link for traction members, including a back plate, and a pressed steel, dish-shaped plate secured at its edges to said back plate, with a wooden filler between the plates.

3. A built-up link for traction members, consisting of a back plate, to one side of which are secured spaced link bars on edge having eyes at their ends for the attachment of a succeeding link, the other side of said back plate carrying a centrally bulged shoe plate with transverse corrugations, the shoe plate being substantially the same width as the back plate, the ends of the back plate turned inwardly, said inwardly turned ends extending beyond the ends of the shoe plate, and said inwardly turned ends being notched to accommodate said edgewise placed eye plates.

4. A built-up link for traction members, consisting of a back plate to one side of which are secured spaced track bars on edge, and each having eyes at its ends for the attachment of a succeeding track bar to form an articulated member, the edges of the back plate extending transversely of the track bars, being turned inwardly whereby the adjacent edges of proximate plates verge toward each other, said inwardly turned edges being notched to straddle the ends of the track bars.

5. A built-up link for articulated track members embodying a shoe having a back plate and transversely arranged projections extending across the shoe, said back plate having its transverse edges bent inwardly away from said projections and having notches formed therein, track bars rigidly secured to the inner faces of said back plate with their ends extending through the notches in the inwardly bent edges of the plate, said track bars having at their ends means whereby track bars of adjacent shoes may be pivotally connected to form an articulated member.

In testimony whereof I have hereunto set my hand in the presence of two subscribing witnesses.

BENJAMIN HOLT.

Witnesses.
 R. S. SPRINGER,
 H. E. THRELFALL.